US012725073B2

(12) United States Patent
Healy et al.

(10) Patent No.: US 12,725,073 B2
(45) Date of Patent: Sep. 1, 2026

(54) METADATA GENERATION FOR INTELLIGENT ORCHESTRATION

(71) Applicant: Dell Products L.P., Round Rock, TX (US)

(72) Inventors: Brendan Burns Healy, Haddonfield, NJ (US); Rômulo Teixeira de Abreu Pinho, Niterói (BR); Miguel Paredes Quiñones, Campinas (BR); Victor Fong, Medford, MA (US)

(73) Assignee: Dell Products L.P., Round Rock, TX (US)

( * ) Notice: Subject to any disclaimer, the term of this patent is extended or adjusted under 35 U.S.C. 154(b) by 669 days.

(21) Appl. No.: 18/345,603

(22) Filed: Jun. 30, 2023

(65) Prior Publication Data

US 2024/0160995 A1 May 16, 2024

Related U.S. Application Data

(60) Provisional application No. 63/383,338, filed on Nov. 11, 2022.

(51) Int. Cl.
*G06N 20/00* (2019.01)
*G06N 10/20* (2022.01)
*G06N 10/80* (2022.01)

(52) U.S. Cl.
CPC ............. *G06N 10/80* (2022.01); *G06N 10/20* (2022.01)

(58) Field of Classification Search
CPC ...................................................... G06N 10/00
See application file for complete search history.

(56) References Cited

U.S. PATENT DOCUMENTS

2023/0315516 A1* 10/2023 Fitzpatrick ............. G06N 10/40 718/102
2024/0428105 A1* 12/2024 Ray ........................ G06N 10/20

OTHER PUBLICATIONS

Cárdenas-López. F. A.; "Enhanced Quantum Synchronization via Quantum Machine Learning"; Jan. 2019; arXiv; 1-9 (Year: 2019).*
Leymann, Frank et al.; "Hybrid Quantum Applications Need Two Orchestrations in Superposition: A Software Architecture Perspective"; 2021; arXiv; May 2021; 1-15 (Year: 2021).*
Vista, Francisco et al.; "Boosting Machine Learning Mechanisms in Wireless Mesh Networks Through Quantum Computing"; 2022; pp. 1-22 (Year: 2022).*
Perrier, Elija et al.; "QDataSet, quantum datasets for machine learning"; Sep. 2022; Nature scientific data; 1-22 (Year: 2022).*

(Continued)

*Primary Examiner* — David Yi
*Assistant Examiner* — Ezra J Baker
(74) *Attorney, Agent, or Firm* — Workman Nydegger

(57) ABSTRACT

One example method includes deploying, in a production environment, a machine learning model that was trained using metadata created by an intermediate classical computing layer, and the metadata comprises information about one or more aspects of a quantum circuit, generating, with the machine learning model, a prediction as to how one or more computing infrastructures may be expected to perform when executing the quantum circuit, based on the prediction, making an orchestration decision concerning the quantum circuit, and orchestrating the quantum circuit to one of the computing infrastructures.

20 Claims, 3 Drawing Sheets

(56) References Cited

OTHER PUBLICATIONS

Faro, Ismael et al.; "Middleware for Quantum: An orchestration of hybrid quantum-classical systems"; Sep. 2023; 2023 IEEE QSW; 1-8 (Year: 2023).*
Vadali, Avi et al.; "Quantum circuit delity estimation using machine learning"; Mar. 2023; arXiv; 1-27 (Year: 2023).*
Qiskit Website, https://www.ibm.com/quantum/qiskit, Sep. 30, 2022.

* cited by examiner

METADATA GENERATION FOR INTELLIGENT ORCHESTRATION

FIELD OF THE INVENTION

Some embodiments of the present invention generally relate to quantum computing. More particularly, at least some embodiments of the invention relate to systems, hardware, software, computer-readable media, and methods, for intelligent orchestration of quantum circuits in a quantum computing environment.

BACKGROUND

Some conventional approaches to orchestration make use of metadata about a submitted quantum circuit to determine how most efficiently to allocate resources such as memory, CPU (central processing unit), and GPU (graphics processing unit), for example. Typically, this metadata indicates the number of qubits and circuit depth, and there is also the ability to consider user preferences such as budget. However, this metadata has thus far been rudimentary in terms of its ability to help predict real resource allocation for execution of the quantum circuit. In particular, there is more to a quantum job than simply the aforementioned parameters. In particular, information and metadata about qubits and circuit depth, alone, are not sufficient to build a robust, predictive ML (machine learning) orchestration model. Finally, quantum circuits have no intrinsic knowledge with regard to the purpose of their execution and so may not provide useful insights regarding their orchestration.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying Figures.

DETAILED DESCRIPTION OF SOME EXAMPLE EMBODIMENTS

Figure 1:
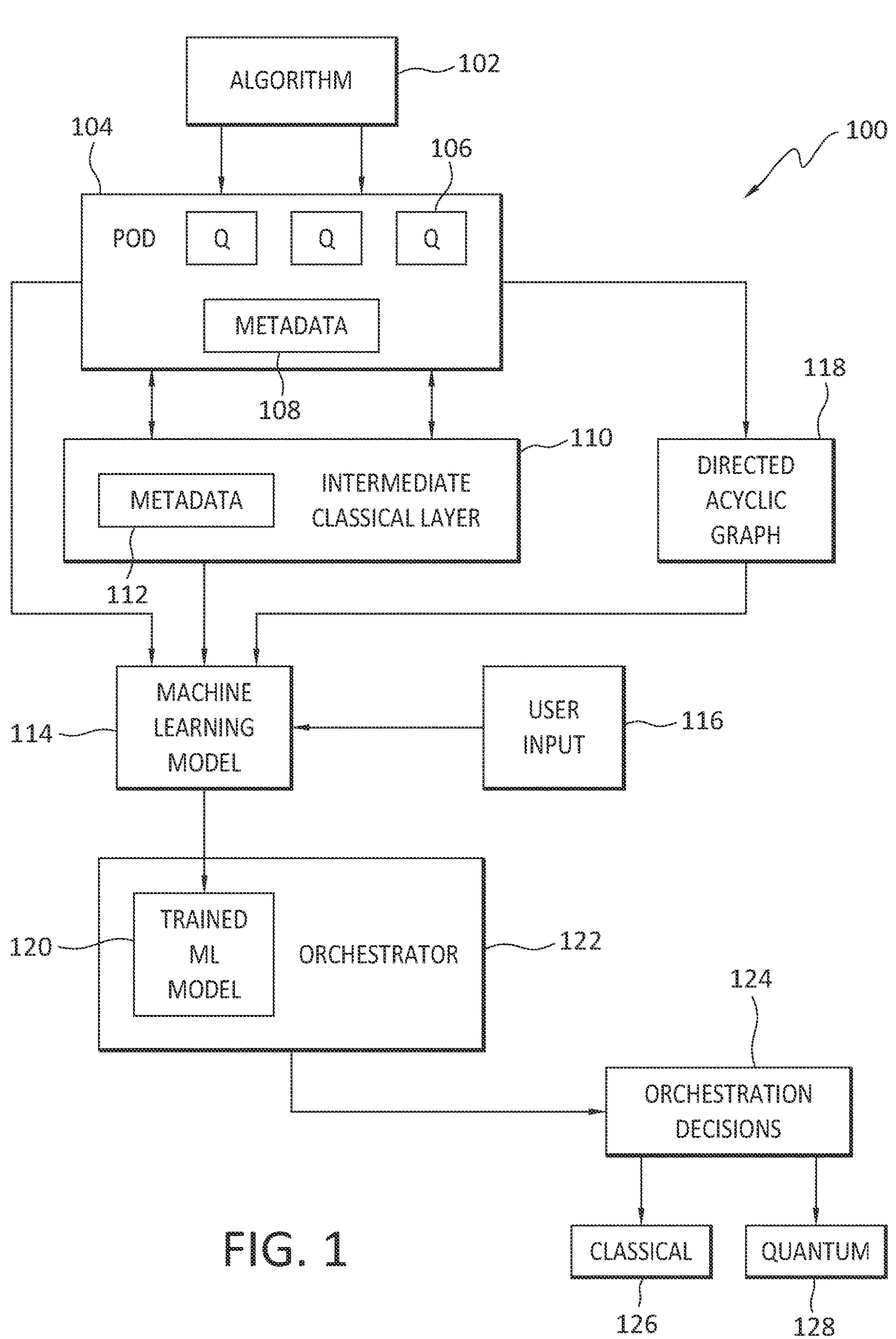
FIG. 1 discloses an architecture according to one example embodiment.

Some embodiments of the present invention generally relate to quantum computing. More particularly, at least some embodiments of the invention relate to systems, hardware, software, computer-readable media, and methods, for intelligent orchestration of quantum circuits in a quantum computing environment.

One example embodiment may comprise a method, and algorithm, that spawns a pod comprising one or more quantum circuits, also referred to herein simply as a 'circuit' or 'circuits,' which may be sent, as part of an orchestration process, to a classical computing infrastructure for simulation, or may be sent to quantum computing hardware for execution. An algorithm according to one embodiment may comprise one or more ML (machine learning) models that may employ metadata about the quantum circuits to determine resource allocations, and performance predictions such as execution time and resource consumption predictions, for simulation or execution, as applicable, of the quantum circuits of the pod.

More particularly, in an embodiment, an algorithm may simulate or emulate quantum mechanical effects on classical computing infrastructure in order to inform resource allocation, and performance predictions. In an embodiment, some of this metadata may be extracted from the pod, such as by an orchestrator, and attached, or otherwise associated with, one or more quantum circuits of the pod. Such metadata, which may or may not come from a user, may include, for example, the number of the quantum circuit, the type of algorithm being run, and the nature of the industry that is submitting the circuit for simulation, or execution.

Further information concerning one or more example embodiments of the invention is disclosed in Appendix A hereto. Appendix A forms a part of this disclosure and is incorporated herein in its entirety by this reference.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an intermediate classical computing layer may be used to generate metadata concerning a quantum circuit. As another example, generated metadata may be used to make predictions as to aspects of quantum circuits such as resource allocation and performance. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Introduction

A method, algorithm, and module, according to one or more embodiments may make use of metadata about a submitted quantum circuit (QC) to determine how most efficiently to allocate resources for the execution of that circuit such as, but not limited to, memory, CPU (central processing unit), and GPU (graphics processing unit), for example. In an embodiment, such metadata may include the number of qubits, and circuit depth, as well as user preferences, such as budget for example, and SLO (service level objectives) parameters and constraints such as execution time, for example.

Embodiments are not limited to these example metadata however, and may additionally, or alternatively, employ other metadata for use by ML models in making predictions about quantum circuit resource allocation, resource consumption, and performance. For example, the hybrid algorithm which spawned the metadata may have substantial context about a quantum circuit which may be missing from the dictionary that was passed to qiskit (an open-source SDK for working with quantum computers at the level of pulses, circuits, and application modules—see https://qiskitorg/). Because an embodiment may have access to this broader context, such an embodiment may, for example, be able to extract and use additional metadata for both resource consumption predictions, and execution time predictions.

B. General Aspects of Some Example Embodiments

An embodiment may be employed in circumstances where metadata concerning qubits and circuit depth, alone, may not be sufficient inputs to build a robust, predictive ML (machine learning) model for predicting quantum circuit resource allocation, resource consumption, and performance.

An embodiment may account for the fact that, in some circumstances at least, a quantum circuit (QC) may have no intrinsic knowledge or awareness as to the purpose of its execution, and thus may lack metadata that would be useful in development of an ML model.

An embodiment may use an intermediate classical layer to generate extra metadata concerning a quantum circuit.

An embodiment may consider such extra metadata for the purpose of improving performance predictions.

C. Detailed Description

C.1 Aspects of Some Example Metadata

When spawning a classical pod which will have quantum circuits to either simulate or send to QPUs (quantum processing units), an embodiment may extract additional information from this classical pod that may be attached as metadata to any such circuit. One example of such a piece of information is what number circuit this is that has been submitted. That is, an embodiment may associate the natural number 1 to the first quantum circuit submitted by a given classical pod, 2 to the second quantum circuit, and so on.

In an embodiment, additional metadata may be sourced from, or at least based on, user submitted information. Such information may include, but is not limited to, the type of algorithm being run, such as Bernstein-Vazirani for example, and/or what industry is submitting the circuit, such as finance, medicine, or legal, for example.

Further, for some methods of simulation according to one or more embodiments, the execution time of a circuit may be highly dependent on the number of non-Clifford gates included in that circuit. Thus, an embodiment may operate to intercept the circuit before transpiration, and count the number of such circuits when certain simulation methods are indicated. This is an illustrative example of a piece and type of metadata that may be useful to obtain by combing through the quantum circuit, which the orchestrator may be performing in any case, such as when looking for circuit cut points.

Finally, another method of metadata extraction according to an embodiment may comprise first representing the quantum circuit a directed acyclic graph (DAG) and then traversing through the graph to obtain useful information. For example, an embodiment may determine, from the DAG, the entanglement characteristics between qubits, as well as the number of each particular gate. Such information may be useful for making runtime predictions, as well as for use by other mechanisms such as, but not limited to, circuit cutting predictions and circuit cutting operations.

C.2 Example Architecture

Directing attention now to FIG. 1, an example architecture according to one embodiment is denoted generally at 100. An algorithm 102 may operate to generate a pod 104, such as a classical computing pod, that may comprise one or more quantum circuits 106. In general, the quantum circuits 106 may be orchestrated to a classical computing infrastructure, or quantum hardware, for execution. In connection with the creation of the quantum circuits 106, various metadata 108 may be generated concerning the quantum circuits 106. In an embodiment, the metadata 108 may be included in the pod 104 and may be attached to, or otherwise associated with, one or more of the quantum circuits 106. Examples of such metadata 108 are disclosed elsewhere herein. In an embodiment, the pod 104 is one possible source of metadata, such as the metadata 108, which may be used for training an ML model 114, examples of which are disclosed herein.

In an embodiment, an intermediate classical computing layer 110 may generate additional metadata 112 concerning one or more of the quantum circuits 106. While not specifically indicated in FIG. 1, the intermediate classical computing layer 110 may be positioned between the algorithm 102, and a quantum circuit post-processing layer (omitted for clarity). This additional metadata 112 is another possible source of metadata that may be used, for example, for training the ML model 114.

In an embodiment, user input 116 may be used as a source of metadata, relating to the quantum circuits 106, that may be used for training the ML model 114. Such user input 116 may comprise, but is not limited to, the type of problem-solving quantum circuit that is being run, such as Bernstein-Vazirani for example, or what industry is submitting that circuit, such as finance, medicine, or engineering, for example.

In an embodiment, metadata relating to the quantum circuits 106, that may be used for training the ML model 114, may be obtained by concerning a quantum circuit 106 into a DAG 118 (directed acyclic graph). In particular, the DAG 118 may be traversed to obtain metadata concerning a quantum circuit 106. By way of illustration, such as traversal may enable determination of entanglement characteristics between qubits of the quantum circuit 106, as well as the number and types of gates in the quantum circuit 106, for example. This information may take the form of metadata and may be provided as an input for training the ML model 114.

For some methods of quantum circuit 106 simulation, the execution time of the circuit 106 may be highly dependent on the number of non-Clifford gates included in that circuit 106. In an embodiment, it may thus be advantageous to intercept the circuit 106 before transpiration, and count the number of such circuits 106 when certain simulation methods are indicated. This is but one example of a piece of metadata that may be useful to obtain by combing through the quantum circuit 106, which an orchestrator may be doing anyway, such as when looking for cut points for a quantum circuit 106.

As these examples herein illustrate, one or more embodiments may generate, obtain, and/or employ, rich metadata about a quantum circuit 106, beyond simply the number of qubits and circuit depth, that may be used to train the ML model 114. The use of rich metadata in training the ML model 114 may result in improvements in performance predictions generated by the ML model 114. Among other things, the performance predictions may indicate how a particular computing infrastructure may be expected to perform, such as in terms of execution time and computing resources consumed for example, when executing a given quantum circuit 106. As discussed below, such performance predictions may, in turn, be used by an orchestrator to place quantum circuits for execution.

In particular, after the ML model 114 has been trained using one or more of the example metadata disclosed herein, the trained ML model 120 may be provided to, or otherwise included in, an orchestrator 122. In general, the orchestrator 122 may employ the trained ML model 120 to make predictions about the execution of a particular quantum circuit 106 on various different types of computing infrastructures to which the orchestrator 122 has access.

Based on the prediction(s) generated by the trained ML model 120, the orchestrator 122 may then make orchestration decisions 124 concerning the quantum circuit(s) 106 to which those predictions pertain. That is, the orchestrator 122 may determine, for example, which of a classical computing infrastructure 126, or a quantum computing infrastructure 128, may provide relatively better performance, as between these two example infrastructures, in terms of the execution of the quantum circuit(s) 106.

D. Further Discussion

As will be apparent from this disclosure, one or more embodiments may possess various useful features and aspects. A non-exhaustive list of examples of such features and aspects is set forth below. No embodiment is required to comprise any of these features and aspects. Further, these are presented only by way of example and are not intended to limit the scope of the invention in any way.

For example, an embodiment may comprise employment of an intermediate classical computing layer to generate extra metadata relating to a quantum circuit. As another example, this metadata may be used, for example, as a basis for generating predictions concerning execution of the quantum circuit on various types of computing infrastructures.

E. Example Methods

Figure 2:
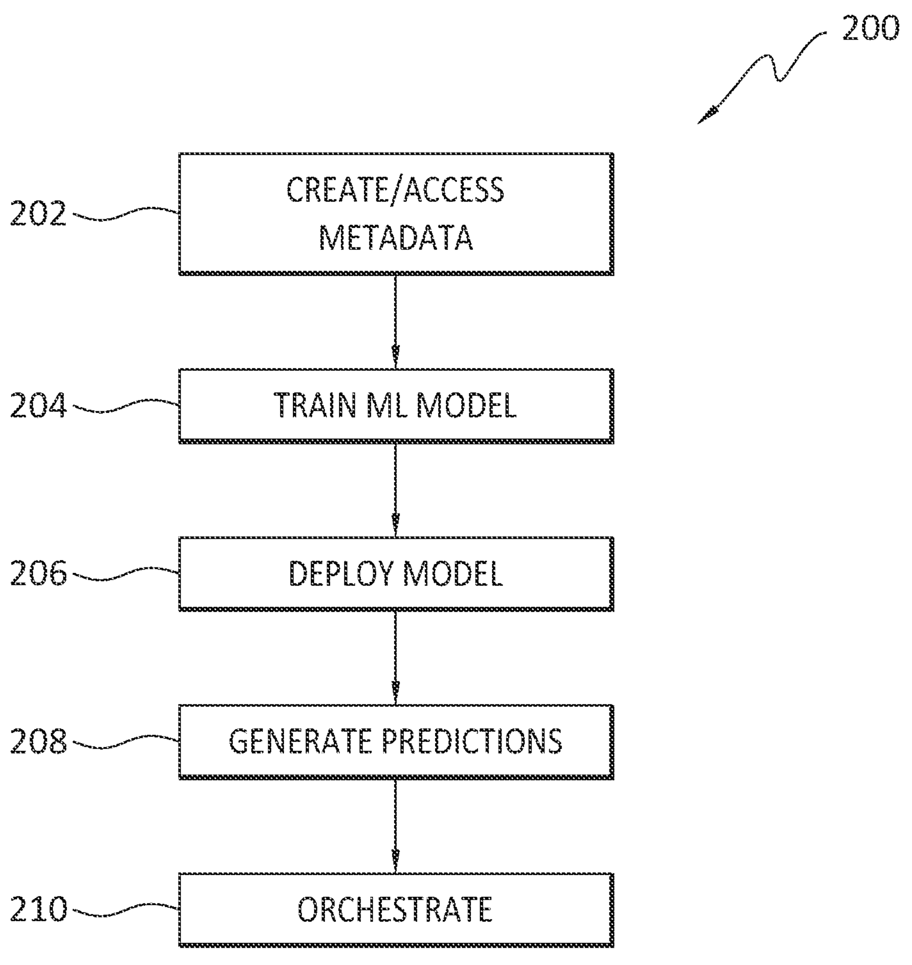
FIG. 2 discloses a method according to one example embodiment.

It is noted with respect to the disclosed methods, including the example methods of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to one embodiment of the invention is generally denoted at 200. The example method 200 may begin with the creation, and/or obtaining, of metadata concerning one or more quantum circuits, with/from an intermediate classical computing layer. The metadata thus created and/or obtained may be combined with metadata of various other types, and from various other sources, as detailed elsewhere herein.

The various metadata may then be used to train 202 an ML model that is configured to generate predictions as to have different types of computing infrastructures may be expected to perform when executing a particular quantum circuit. Such predictions may comprise, for example, predictions as to resources expected to be consumed by execution of the quantum circuit, and predictions as to the amount of time expected to be needed to execute the quantum circuit.

The trained ML model may then be deployed 206 to a production environment. In one particular embodiment, the trained ML model may be deployed 206 to an orchestrator, or otherwise made available to the orchestrator.

The trained ML model, possibly at the request of, or instantiation by, the orchestrator, may then generate 208 one or more predictions indicating how different types of computing infrastructures may be expected to perform when executing a particular quantum circuit. Note that while one computing infrastructure may be expected to perform better with respect to execution time, another infrastructure may be expected to perform better in terms of resource consumption. Thus, the orchestrator may have to balance considerations such as these, as well as user-specified priorities, such as may be embodied in an SLO for example, when making an orchestration decision.

Once the orchestration decision has been made, the orchestrator may then orchestrate 210 the quantum circuit to a computing infrastructure for execution. Note that metadata generated in connection with the execution of the quantum circuit on the computing infrastructure may be captured and used to update, or retrain, the ML model whose predictions were the basis for the orchestration decision.

In an embodiment, the operations 202 and 204 may be performed offline, and may collectively comprise a training process. In that embodiment, the operations 206, 208, and 210 may be performed online, and may collectively comprise an inferencing process.

F. Further Example Embodiments

Following are some further example embodiments of the invention. These are presented only by way of example and are not intended to limit the scope of the invention in any way.

Embodiment 1. A method, comprising: deploying, in a production environment, a machine learning model that was trained using metadata created by an intermediate classical computing layer, and the metadata comprises information about one or more aspects of a quantum circuit; generating, with the machine learning model, a prediction as to how one or more computing infrastructures may be expected to perform when executing the quantum circuit; based on the prediction, making an orchestration decision concerning the quantum circuit; and orchestrating the quantum circuit to one of the computing infrastructures.

Embodiment 2. The method as recited in any preceding embodiment, wherein the metadata comprises a natural number assigned to the quantum circuit in a classical computing pod that includes the quantum circuit.

Embodiment 3. The method as recited in any preceding embodiment, wherein the machine learning model was trained using additional metadata comprising information indicating a number of qubits in the quantum circuit, and a depth of the quantum circuit.

Embodiment 4. The method as recited in any preceding embodiment, wherein the machine learning model was trained using additional metadata received from a user.

Embodiment 5. The method as recited in any preceding embodiment, wherein the machine learning model was trained using additional metadata obtained by traversing a directed acyclic graph that was created by conversion of the quantum circuit.

Embodiment 6. The method as recited in any preceding embodiment, wherein the prediction comprises one or more of a prediction as to resources expected to be consumed by execution of the quantum circuit on the one or more computing infrastructures, and a prediction as to an execution time of the quantum circuit on the one or more computing infrastructures.

Embodiment 7. The method as recited in any preceding embodiment, wherein the computing infrastructures comprise one or more classical computing infrastructures and/or one or more quantum computing infrastructures.

Embodiment 8. The method as recited in any preceding embodiment, wherein the prediction is more accurate than a prediction that could be obtained by the machine learning model without use of the metadata created by the intermediate classical computing layer.

Embodiment 9. The method as recited in any preceding embodiment, wherein the quantum circuit is intercepted prior to transpiration, and a number of non-Clifford gates in the quantum circuit is determined and used as a basis for the prediction.

Embodiment 10. The method as recited in any preceding embodiment, wherein the machine learning model was trained using additional metadata obtained by examination of another quantum circuit by an orchestrator that performs the orchestrating.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed. In general, embodiments may comprise classical, and/or quantum, hardware and/or software.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
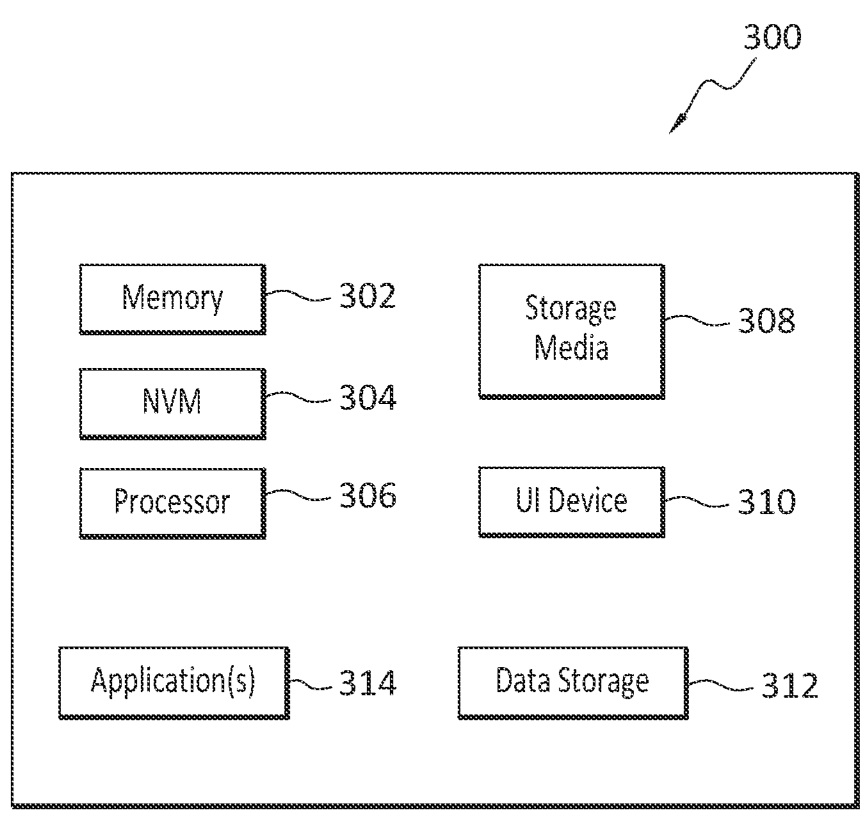
FIG. 3 discloses a computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 5.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

deploying, in a production environment, a machine learning model that was trained using metadata created by an intermediate classical computing layer, and the metadata comprises information about one or more aspects of a quantum circuit;

generating, with the machine learning model, a prediction as to how one or more computing infrastructures may be expected to perform when executing the quantum circuit;

based on the prediction, making an orchestration decision concerning the quantum circuit; and orchestrating the quantum circuit to one of the computing infrastructures.

2. The method as recited in claim 1, wherein the metadata comprises a natural number assigned to the quantum circuit in a classical computing pod that includes the quantum circuit.

3. The method as recited in claim 1, wherein the machine learning model was trained using additional metadata comprising information indicating a number of qubits in the quantum circuit, and a depth of the quantum circuit.

4. The method as recited in claim 1, wherein the machine learning model was trained using additional metadata received from a user.

5. The method as recited in claim 1, wherein the machine learning model was trained using additional metadata obtained by traversing a directed acyclic graph that was created by conversion of the quantum circuit.

6. The method as recited in claim 1, wherein the prediction comprises one or more of a prediction as to resources expected to be consumed by execution of the quantum circuit on the one or more computing infrastructures, and a prediction as to an execution time of the quantum circuit on the one or more computing infrastructures.

7. The method as recited in claim 1, wherein the computing infrastructures comprise one or more classical computing infrastructures and/or one or more quantum computing infrastructures.

8. The method as recited in claim 1, wherein the prediction is more accurate than a prediction that could be obtained by the machine learning model without use of the metadata created by the intermediate classical computing layer.

9. The method as recited in claim 1, wherein the quantum circuit is intercepted prior to transpiration, and a number of non-Clifford gates in the quantum circuit is determined and used as a basis for the prediction.

10. The method as recited in claim 1, wherein the machine learning model was trained using additional metadata obtained by examination of another quantum circuit by an orchestrator that performs the orchestrating.

11. A non-transitory storage medium having stored therein instructions that are executable by one or more hardware processors to perform operations comprising:

deploying, in a production environment, a machine learning model that was trained using metadata created by an intermediate classical computing layer, and the metadata comprises information about one or more aspects of a quantum circuit;

generating, with the machine learning model, a prediction as to how one or more computing infrastructures may be expected to perform when executing the quantum circuit;

based on the prediction, making an orchestration decision concerning the quantum circuit; and orchestrating the quantum circuit to one of the computing infrastructures.

12. The non-transitory storage medium as recited in claim 11, wherein the metadata comprises a natural number assigned to the quantum circuit in a classical computing pod that includes the quantum circuit.

13. The non-transitory storage medium as recited in claim 11, wherein the machine learning model was trained using additional metadata comprising information indicating a number of qubits in the quantum circuit, and a depth of the quantum circuit.

14. The non-transitory storage medium as recited in claim 11, wherein the machine learning model was trained using additional metadata received from a user.

15. The non-transitory storage medium as recited in claim 11, wherein the machine learning model was trained using additional metadata obtained by traversing a directed acyclic graph that was created by conversion of the quantum circuit.

16. The non-transitory storage medium as recited in claim 11, wherein the prediction comprises one or more of a prediction as to resources expected to be consumed by execution of the quantum circuit on the one or more computing infrastructures, and a prediction as to an execution time of the quantum circuit on the one or more computing infrastructures.

17. The non-transitory storage medium as recited in claim 11, wherein the computing infrastructures comprise one or more classical computing infrastructures and/or one or more quantum computing infrastructures.

18. The non-transitory storage medium as recited in claim 11, wherein the prediction is more accurate than a prediction that could be obtained by the machine learning model without use of the metadata created by the intermediate classical computing layer.

19. The non-transitory storage medium as recited in claim 11, wherein the quantum circuit is intercepted prior to transpiration, and a number of non-Clifford gates in the quantum circuit is determined and used as a basis for the prediction.

20. The non-transitory storage medium as recited in claim 11, wherein the machine learning model was trained using additional metadata obtained by examination of another quantum circuit by an orchestrator that performs the orchestrating.

* * * * *